United States Patent Office 2,797,231
Patented June 25, 1957

2,797,231

STABILIZATION OF OILS WITH B-(CARBOXY-METHYLMERCAPTO) TRICARBALLYLIC ACID

Cyril D. Evans, Peoria Heights, and Arthur W. Schwab, Peoria, Ill., assignors to the United States of America as represented by the Secretary of Agriculture No Drawing. Application March 25, 1955,
Serial No. 496,959

1 Claim. (Cl. 260—398.5)

(Granted under Title 35, U. S. Code (1952), sec. 266)

A non-exclusive, irrevocable, royalty-free license in the invention herein described, for all governmental purposes, with power to grant sublicenses for such purposes, is hereby granted to the Government of the United States of America.

This invention relates to a novel chemical compound, β-(carboxymethylmercapto)tricarballylic acid, and to a method for its preparation. It relates further to the stabilizing of glyceride oils with said acid.

The novel acid of this invention has been found to possess unique properties, particularly its ability to form stable complexes with heavy metal ions, such as iron and copper. Its unique properties render it valuable as a sequestering agent, particularly in the stabilization of fats and fatty compounds against oxidative deterioration.

Utilizing our discoveries with respect to the unique complexing propreties of β-(carboxymethylmercapto) tricarballylic acid, we have developed a method for stabilizing fats and fatty materials by the addition of small amounts of the novel acid thereto. This invention, therefore, relates further to the stabilization of such fats and fatty materials.

β-(carboxymethylmercapto) tricarballylic acid has the following structural formula:

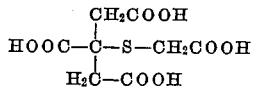

It may be prepared by the reaction of aconitic acid and mercaptoacetic acid. The reaction is conveniently carried out by bringing into reactive contact molar proportions of the two acids in an aqueous medium. The reaction is hastened by heating to near boiling temperatures, but will proceed satisfactorily at temperatures above 60° C. It may be recovered from the reaction mixture by evaporation of the water. The β-(carboxymethylmercapto) tricarballylic acid, thus recovered, may be purified by crystallization from a volatile organic solvent. The following specific example is illustrative of the preparation:

EXAMPLE 1

Seventeen and four tenths grams (0.1 mole) of aconitic acid and 9.2 g. (0.1 mole) of mercaptoacetic acid, dissolved in 100 ml. of water, were heated on the steam bath for 4 hours. The solution was then evaporated to dryness and the product crystallized from ethyl acetate.

M. P. 137–8° C. (sealed tube), decomp.

Neutral equivalent 66.9 (theory 66.5)

| Analysis | Found | Theory |
|---|---|---|
| C | 36.1 | 36.1 |
| H | 3.98 | 3.76 |
| S | 12.2 | 12.0 |

As noted above, glyceride oils are stabilized by the addition of minor amounts of the acid. The following examples illustrate this particular use, but it will be evident to those skilled in the art that its broad utility in the stabilization of organic compounds is not so limited.

The stabilizing effect of the acid is demonstrated by the oxidative stability of the treated oils as measured either chemically or organoleptically. The acid lends stability to the treated oils even in the presence of minor amounts of added impurities such as iron and copper.

These latter impurities frequently exist in refined oils in minor amounts, and are known for their deleterious effect upon the storing qualities of the oil. Although we do not wish to be restricted to any theoretical explanation of the mechanisms involved in our invention, we believe the reason that our new compound is effective relates principally to its chemical structure.

The acid, which we shall term S-tetraacid for the sake of brevity, is pentadentate, as will be seen from its structural formula. It forms stable complexes with heavy metal ions by the formation of stable chelate rings in the molecule. Once thus complexed, the heavy metal ion is effectively removed as a reactive element from its environment.

When using S-tetraacid as a stabilizing agent for oils, it is advisable to add it after the oil has passed through all of its major treatment steps. It is convenient to add it, in an amount of from 0.002% to 0.05%, based on the weight of the oil, on the downgrade or cooling phase of the deodorization step.

A chemical evaluation based on the active oxygen method or (Swift stability test) was made of oils stabilized according to this invention. The test provides the peroxide values, taken after the samples are blown with air for 8 hours at 208° F. These are termed the A. O. M. values. The oils were also evaluated organoleptically. The taste panel was composed of persons skilled in taste testing, and the flavor scores given below are based on a 1 to 10 scoring system in which the highest score is 10. A flavor score of 6.0 or higher indicates an acceptable oil. The results of the evaluations are summarized in the following Table 1.

*Table 1*

| Oil | Control | | | 0.01% S-Tetraacid | | |
|---|---|---|---|---|---|---|
| | A.O.M. Peroxides | Flavor Score | | A.O.M. Peroxides | Flavor Score | |
| | | At 0 time | Stored 4 days at 60° C. | | At 0 time | Stored 4 days at 60° C. |
| Oil No. 1, soybean | 33 | 6.8 | 5.2 | 3.0 | 7.4 | 5.9 |
| Oil No. 1+0.1 p. p. m. Cu | 68 | 6.1 | 2.5 | 12.0 | 7.5 | 5.1 |
| Oil No. 2, soybean | 36 | 7.1 | 4.9 | 3.0 | 7.1 | 6.0 |
| Oil No. 2+0.3 p. p. m. Fe | 54 | 5.6 | 4.9 | 9.0 | 6.5 | 5.4 |
| Oil No. 3, cottonseed | 12 | 8.7 | 7.2 | 8.1 | 9.0 | 7.2 |
| Oil No. 3+0.3 p. p. m. Fe | 37 | 8.2 | 5.8 | 14.0 | 8.1 | 7.4 |
| Oil No. 4, soybean | 43 | 7.9 | 5.6 | 7.2 | 8.6 | 7.3 |
| Oil No. 4+0.3 p. p. m. Fe | 74 | 5.8 | 3.9 | 17.0 | 8.4 | 6.4 |

We claim:

The method of stabilizing a glyceride oil which comprises adding thereto a minor amount of β-(carboxymethylmercapto) tricarballylic acid.

References Cited in the file of this patent

UNITED STATES PATENTS

| | | |
|---|---|---|
| 2,390,024 | Bruson | Nov. 27, 1945 |
| 2,503,401 | Mattano et al. | Apr. 11, 1950 |
| 2,662,905 | Schwab et al. | Dec. 15, 1953 |
| 2,668,847 | Newton | Feb. 9, 1954 |